Nov. 21, 1944.    T. BROWN    2,363,292
CONTROLLING MECHANISM FOR AGRICULTURAL IMPLEMENTS
Filed Nov. 29, 1940
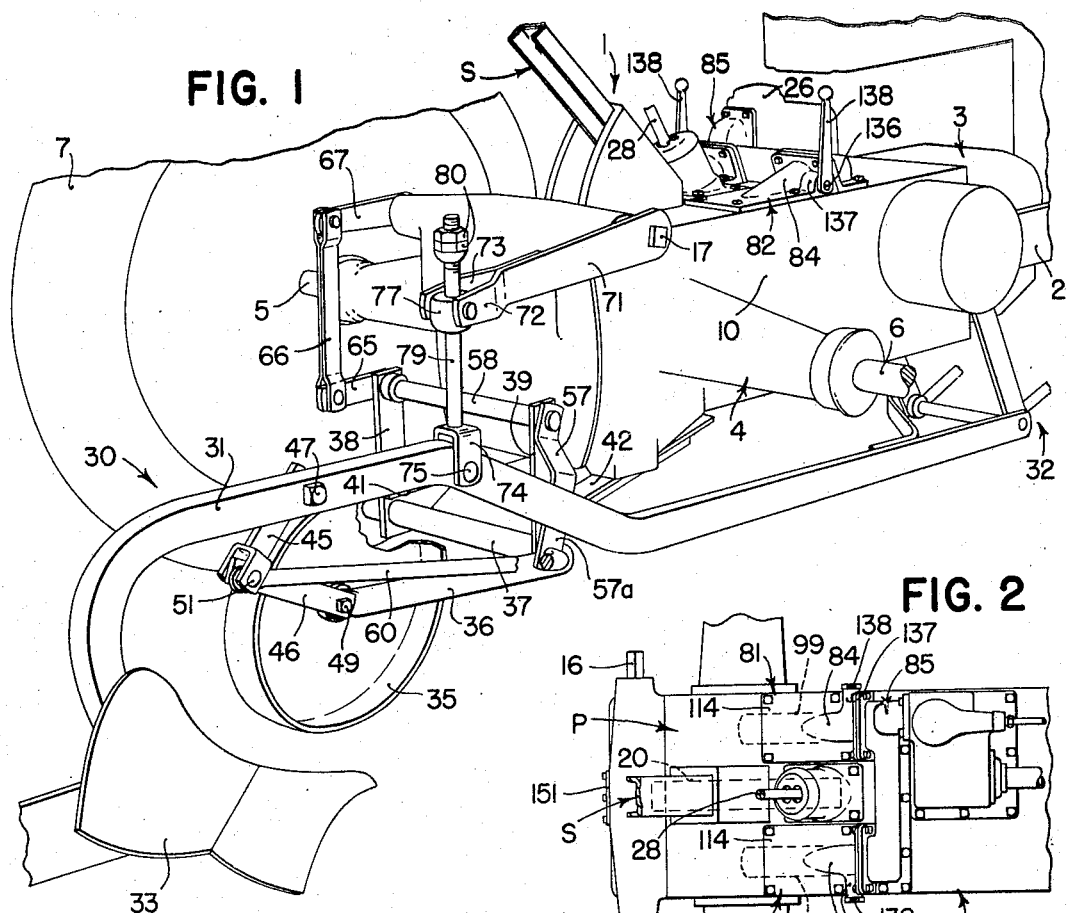
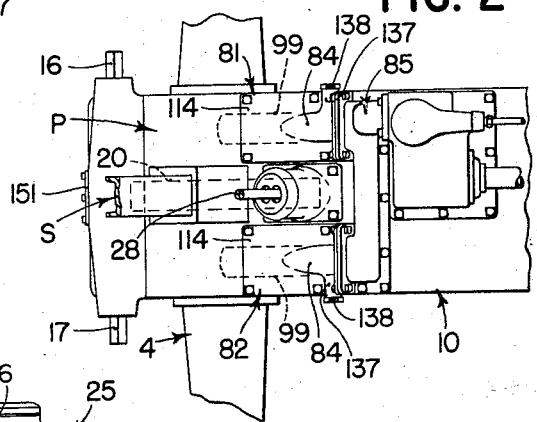
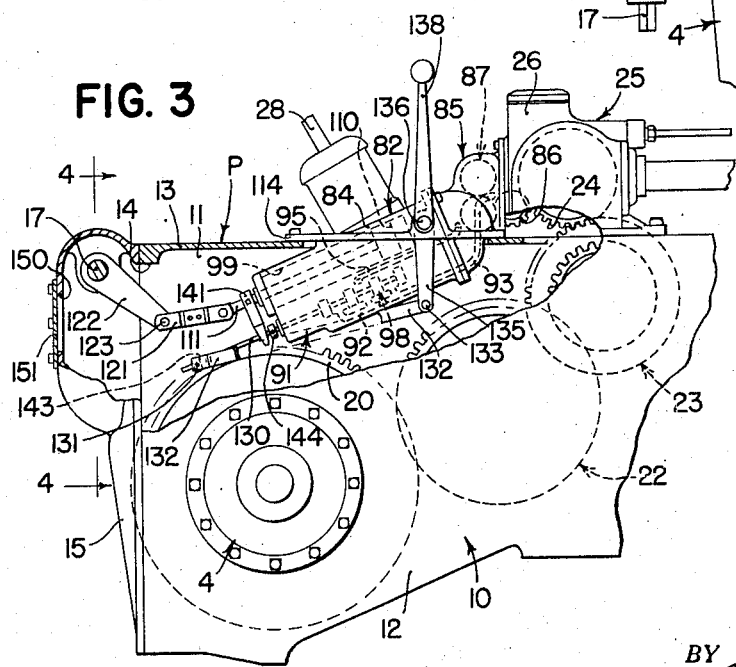
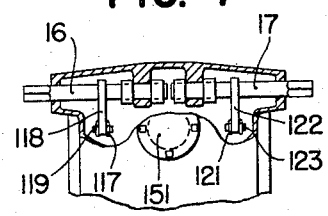
INVENTOR:
Theophilus Brown
BY
ATTORNEYS.

Patented Nov. 21, 1944

2,363,292

UNITED STATES PATENT OFFICE 2,363,292

CONTROLLING MECHANISM FOR AGRICULTURAL IMPLEMENTS

Theophilus Brown, Moline, Ill., assignor to Deere & Company, Moline, Ill., a corporation of Illinois Application November 29, 1940, Serial No. 367,709

18 Claims. (Cl. 97—50)

The present invention relates generally to agricultural machines and more particularly to tractor propelled or supported implements in which means deriving power from the tractor effects adjustment of the implement.

The object and general nature of the present invention resides in the provision of a pair of hydraulic units independently operable and operatively connected with said tool means for effecting two adjustments thereof. For example, one adjustment may be an adjustment for depth, in which operating one of the hydraulic units in one direction or the other adjusts the operating depth of the tool means. The other adjustment may be a raising and lowering operation, in which the other hydraulic unit may be connected to raise the tool means into inoperative or transport position. It is also a feature of this invention to provide a pair of separately controlled hydraulic units for effecting the desired control of any agricultural implement associated with the tractor.

It is also a feature of this invention to provide a pair of hydraulic units which are disposed, at least partially, within the transmission housing of the tractor and operatively connected within the transmission housing to part or parts to be actuated thereby. It is also a feature of this invention to provide a pair of hydraulic units which are mounted on and operatively connected with means carried by the transmission housing so that interference with an operator at the operator's station on the tractor is eliminated.

More specifically, it is a feature of this invention to provide an agricultural machine of the integral or tractor mounted type in which the tool means may be adjusted in depth by one hydraulic unit and raised, or lowered, by a separate hydraulic unit. It is also a feature of this invention to provide an improved hydraulic lifting and/or controlling means which derives power from a fluid pump operatively connected to be driven from the governor driving means of the tractor. It is also a feature of this invention to provide a pair of hydraulic units for a farm tractor, which units are disposed on or in the transmission housing on opposite sides of operating parts of the transmission housing, thus placing the parts out of the way of the operator.

These and other objects and advantages of the present invention will be apparent to those skilled in the art after a consideration of the following detailed description of the preferred embodiment, taken in conjunction with the accompanying drawing.

In the drawing:

Figure 1 is a perspective view of an agricultural machine of the integral or tractor mounted type in which the principles of the present invention have been incorporated;

Figure 2 is a fragmentary plan view of the machine shown in Figure 1;

Figure 3 is a side view of a portion of the outfit shown in Figure 1, showing particularly the hydraulic units; and Figure 4 is a sectional view taken generally along the line 4—4 of Figure 3.

Referring now more particularly to Figure 1, the tractor which serves as an implement or supporting frame is indicated in its entirety by the reference numeral 1 and includes a frame 2 which supports the tractor motor 3, a rear axle structure 4, the latter including axle shafts 5 and 6 upon which the rear traction wheels 7 of the tractor are mounted. In Figure 1, the near rear wheel has been removed in order to show the other parts to better advantage. Forming a part of the frame 2 and connecting the latter with the rear axle 74 is a transmission housing indicated in its entirety by the reference numeral 10. The transmission housing 10 is generally of rectangular configuration, embodying side walls 11 and 12. The transmission housing 10 also includes a top wall 13 and an open rear end 14 which is closed by a cover plate 15. The later includes suitable bearing supports for a pair of axially aligned rock shafts 16 and 17 (Figure 2) to which reference will be made later.

The rear axle shafts 5 and 6 are driven, through conventional differential mechanism (not shown) from a ring gear 20, and the latter is driven by the motor 3 through conventional gearing, including a speed change mechanism 22. The gearing just mentioned includes a gear 23 which, through a gear 24, drives a governor 25 disposed in a housing 26 formed on or carried by the transmission housing 10. The top wall 13 of the transmission housing 10 carries a gear shift lever 28 which controls the selection of ratios in the speed change transmission 22, as in conventional practice. Normally, the gear shift lever 28 is disposed approximately centrally between the sides of the transmission housing. Other operating parts of the tractor 1 may also be carried by the transmission housing 10. The gear shift lever 28 is therefore representative of any operating part or parts carried on this portion of the tractor.

The modern farm tractor, of which the tractor 1 is representative, is adapted to receive and support many different kinds of farm implements for various tillage, seeding, cultivating, and/or harvesting operations. Most, if not all, of these tools are capable of being and during operation are required to be adjusted from time to time, and as mentioned above, it is one of the principal features of this invention to provide means deriving power from the tractor motor for adjusting the implement conveniently and easily by the use of hydraulic units mounted on the tractor. In order to represent these various implements I have, for purposes of illustration, chosen a plow of the integral type, that is, a plow which is connected in draft transmitting relation with and supported on the tractor or controlled by the tractor at all times. Conventionally, such a plow has two adjustments, one to control the depth of plowing and the other to raise and lower the plow into and out of inoperative or transport position. Hence, for purposes of illustration, I have shown my new and improved hydraulic mechanism as particularly arranged to effect the two adjustments of depth control and lifting control.

Referring now more particularly to Figure 1, the integral implement chosen to illustrate the principles of the present invention embodies a plow 30 including a plow beam 31 connected by hitch means 32 to the forward portion of the tractor 1 and carrying at its rear end a plow bottom 33. According to the principles of the present invention the depth of operation of the plow bottom 33 is controlled by a gauge wheel 35 journaled for rotation on the rear end of a swinging link 36, the laterally directed forward end 37 of which is mounted for general vertical rocking movement and generally lateral shifting movement in a pair of vertical standards 38 and 39 which are connected in any suitable manner to a pair of brackets 41 and 42 secured by any suitable means to the rear axle of the tractor, preferably to the under side of the enlarged central portion of the rear axle housing 4. By virtue of this construction the gauge wheel 35 is attached to the tractor yet can follow variations of the ground surface independent of the tractor. Also, when the plow beam swings laterally, a small amount of which is permitted by the draft connections 32, the gauge wheel 35 follows the plow beam since the end 37 can shift laterally in the standards 38 and 39.

The position of the gauge wheel 35 relative to the plow beam 31 is controlled by connections therebetween which include a pair of toggle links or arms 45 and 46. The link or arm 45 is pivoted to the beam 31 by a bolt or other means 47, and the lower link or arm 46 is pivoted to the swinging link or crank axle 36 by means of a bolt or other means 49, preferably arranged on the axis of rotation of the gauge wheel 35. The two arms or links 45 and 46 are pivotally interconnected by means of a pin or other means 51. When the toggle arms or links 45 and 46 are moved into collapsed position the gauge wheel 35 is nearest the plow beam 31, and hence the plow bottom 33 is arranged for deep plowing. When the toggle arms or links 45 and 46 are extended the gauge wheel 35 is farthest from the plow beam 31 and hence the plow bottom 33 is arranged for shallow plowing.

The connections for swinging the arms or links 45 and 46 so as to shift the gauge wheel 35 relative to the plow beam 31 to control the depth of plowing include an arm 57 fixed to the right end of a transverse shaft 58 which is supported at its opposite ends in the upper ends of the vertical standards 38 and 39. The lower end of the arm 57 is connected by means of a link 60 to the pivot pin 51 that connects the toggle arms 45 and 46. It will be observed that the lower end 57a of the arm 57 is disposed closely adjacent the axis of the swinging crank axle section 37 so that the plow beam 31 may swing vertically with relatively free movement but such movement will not materially change the position of the gauge wheel 35 relative to the plow bottom 33, and hence the depth of plowing will not be affected even though the plow is thus connected with the tractor for relatively free floating movement. The end of the transverse shaft 58 opposite the arm 57 carries an arm 65 to the outer end of which the lower end of a link 66 is pivoted. The upper end of the link 66 is pivoted to an arm 67 which is fixed to the laterally outer end of the left hand transverse rock shaft 16, as best shown in Figure 2. Thus, rocking movement of the left hand rock shaft 16 serves to control the operating depth of the plow bottom 33.

The right hand rock shaft 17 carries an arm 71 which preferably is provided or formed with a pair of yoke sections 72 and 73 which are spaced apart and receive a trunnion 77 therebetween. The latter is apertured and slidably disposed about the upper end of a link 79, the uppermost portion of which is threaded and receives a pair of lock nuts 80. The lower end of the link 79 is formed or provided with a yoke 74 which is connected by a pivot 75 to the plow beam 31. In the normal operating position, as shown in Figure 1, the trunnion member 77 is disposed a substantial distance below the lock nuts 80, which construction provides means in the form of a lost motion connection between the beam 31 and the power lift mechanism to accommodate the above mentioned floating movement of the plow relative to the tractor. Thus, the gauge wheel 35 determines the operative position of the plow bottom 33 independently of the position of the tractor, but when the rock shaft 17 is rocked to swing the arm 71 upwardly, as indicated by the arrow in Figure 1, the above mentioned lost motion is taken up and the plow is lifted through the lifting link 79.

No claim is made in this application to the particular implement details just described, since they are shown and claimed in my Patent No. Re. 22,019, issued February 10, 1942.

According to the principles of the present invention, I provide two separately operable independent hydraulic units, both deriving energy from the tractor, for separately controlling the rock shafts 16 and 17, and in order to provide such hydraulic units on the tractor 1 and to dispose them so as not to interfere with the operator on the tractor, for which the tractor seat S and tractor platform P are provided, I extend the hydraulic units into the interior of the transmission housing 10.

Referring now more particularly to Figures 2, 3 and 4, the two hydraulic units are indicated by the reference numerals 81 and 82, and each consists of a cylinder casting 84 which is bolted to a pump casting 85 that extends transversely of the tractor and has a portion bolted to the rear face of the governor housing 26. The latter is provided with an opening through which a gear 86 may extend, the gear 86 serving to mesh with the governor driving gear 24 and thereby deriving energy to drive a pair of gear pumps, each of which is indicated in its entirety by the reference numeral 87, and mounted in the pump casting 85. The other pump is disposed alongside and substantially identical with the pump 87 shown in Figure 3, both being driven through gear 86 from the gear 24. The gear pumps 87 are adapted to serve as a source of fluid pressure on the tractor and to this end may be of any suitable or conventional construction. Each of the hydraulic units 81 and 82 has its cylinder casting 84 formed with an extension 91 serving as a valve housing in which a passage 92 is formed that communicates with a similar passage 93 formed in the pump casting 85, the passage 93 leading to the pressure side of the associated gear pump 87. Another passage 95 is formed in each valve housing 91 and leads through suitable passages in the pump casting 85 to the sump of the associated gear pump 87. A valve 98 is disposed in each of the valve housings 91 and has three positions, one in which fluid from the pump is returned to the sump without entering the cylinder 99 which is formed in each cylinder casting 85. The other two positions of the valve 98 serve to direct fluid under pressure into one or the other of the ends of the associated cylinder 99.

A piston 110 is disposed in each cylinder 99 and has connected thereto a piston rod 111 which extends outwardly of the cylinder, through a suitable packing gland 112. The two cylinder castings 81 and 82 have bolting flanges 114 formed thereon, and the upper wall 13 of the transmission housing 10 is apertured on opposite sides of the gear shift lever so as to permit each cylinder casting extending down into the interior of the transmission housing 10, as best shown in Figure 2. The two cylinders 84 are thus disposed on opposite sides of the ring gear 20, but this construction may vary, if desired. The piston rod 111 of the left hand hydraulic unit 81 is connected by a link 117 to an arm 118 that is fixed to the inner end of the left hand rock shaft 16 and extends into the rear portion of the transmission case 10. Preferably, a quick detachable pivot pin 119 is provided to facilitate assembly, as will be referred to later. The right hand hydraulic unit 82 has its piston connected by a link 121 to an arm 122 fixed to the inner end of the right hand rock shaft 17, preferably by a quick detachable pivot pin 123 similar to or identical with the pivot pin 119.

The valve mechanism 98, mentioned above, is preferably like that shown in the patent to Harold Brown, issued October 10, 1933, No. 1,929,804, to which reference may be had if desired. Since the details of such valve mechanism is fully disclosed in said patent, the same has not been shown in detail since, so far as the present invention is concerned, any suitable valve mechanism may be utilized. Preferably, however, each valve 98 includes a stem 130 extending from the associated valve housing 91 and is pivotally connected, as at 131, to a link 132 that extends alongside the associated cylinder casting and is pivoted, as at 133, to the lower end of a valve operating lever 135. The latter is fixed to a rock shaft 136 carried in a boss 137 formed in the upper or exposed part of the associated cylinder casting 84. The rock shaft 136 extends outwardly and receives a handle or operating member 138 which is accessible to the operator. Thus, by shifting the handle 138 in one direction or the other, the valve mechanism may be actuated to force the piston of that cylinder in one direction or the other, or to lock it in any selected position, this being the operation disclosed in the above mentioned prior patent. Each cylinder casting 84 is provided with such valve operating means. Also, each piston rod 111 is provided with an arm 141 which is forced to embrace the valve operating stem 130 associated therewith, and the latter carries stops 143 and 144 spaced so that when the piston reaches the end of its movement in one direction the valve 98 associated therewith is automatically returned to a neutral position.

In assembly, the pump casting 85 and the two cylinder castings 84 are bolted in place against the governor housing 26 and the upper part of the transmission case, and in assembling these parts the links 117 and 121 are connected to the piston rods associated therewith before the parts are inserted in the transmission case. The rear transmission cover 15 is provided with a hand hole 150 and cover therefor, indicated by the reference numeral 151. By taking off the cover 151 after mounting the transmission cover 15 in place, access may be had for the insertion of the pivot pins 119 and 123. Thus, after the cylinders and pump housing are mounted in place, the rear transmission housing 15 may be bolted in place, and then lastly the connection between the rock shaft arms 118 and 122 and the associated links 117 and 121 may be effected. After that is done the hand hole cover plate 152 may be secured in place, thus protecting the working parts of the hydraulic units from dirt and grit while adequately lubricating them by the lubricant in the rear axle housing.

In operation, one hydraulic unit is actuated to adjust the depth of operation, by rocking the left hand rock shaft 16, and by returning the left hand valve handle to its intermediate position whenever the desired depth is reached, that depth may be retained by virtue of the hydraulic lock which is effected when the associated valve 98 is returned to its neutral or intermediate position. Likewise, whenever it is desired to raise the plow to transport position, the right hand valve handle is moved so as to direct fluid pressure from the pump 87 to one side of the piston so as to rock the right hand rock shaft 17 in a direction to raise the lifting arm 71. If desired, the latter need not be rocked through its entire range, especially when merely turning at the end of the field, since the valve handle may be returned to neutral position at any time and the plow locked hydraulically in its raised position.

It will be observed that with both hydraulic units of the type shown in the Harold Brown patent mentioned above, namely, a double acting unit which can be moved in either direction under power and locked hydraulically in any intermediate position and a separate hydraulic circuit including a pair of pump gears and a control valve for each unit, almost any type of adjustment may be effected, and such adjustment may be retained against forces tending to move the associated parts out of adjustment. Similarly, if it should be desired to effect a movement of some part which requires more power than one cylinder is adapted to transmit, the two operating arms 67 and 71 may be connected together to act as one part, in which twice the power normally available may be utilized. Disposing the two cylinders on opposite sides of the conventional tractor operating parts, of which the gear shift lever 28 is representative, provides an enclosed arrangement, out of the way of the operator, in which the major portion of the operating parts are protected from dirt, grit and the like, yet the control of such units is conveniently accessible to the operator at station S on the tractor.

While I have shown and described above the preferred form of my invention, it is to be understood that my invention is not to be limited to the particular details shown and described above, but that, in fact, widely different means may be employed in the practice of the broader aspects of my invention.

What I claim, therefore, and desire to secure by Letters Patent is:

1. An agricultural machine comprising a ground working tool, a first piston and cylinder unit for adjusting the operating depth of said tool, a second piston and cylinder unit for raising said tool into inoperative position and power driven means for supplying fluid under pressure to said piston and cylinder units to actuate the latter.

2. The combination with a tractor having a motor, an agricultural ground working tool movably connected with the tractor and adapted to be moved to various working positions and to be raised and lowered, a pair of hydraulic units, means connecting one hydraulic unit with said tool for controlling the operating depth thereof, means connecting the other hydraulic unit with said tool to raise the latter into inoperative position and motor driven means for supplying fluid under pressure to said hydraulic units to actuate the latter.

3. In an agricultural implement, the combination of a tractor having a transmission housing, a pair of rock shafts, each including an arm extending into said transmission housing, ground working tool means connected with the tractor, means connecting said tool means with said rock shafts whereby movement of one of said shafts controls the operating depth of said tool means and movement of the other shaft controls the raising and lowering of said tool means, a pair of hydraulic piston and cylinder units carried adjacent each side of said transmission housing, means connecting one of said units with one of said rockshafts whereby said one unit controls the operating depth of said tool means, and means connecting the other of said units with the other of said rockshafts whereby said other unit controls the raising and lowering of said tool means, and means for supplying fluid under pressure to said hydraulic units.

4. In an agricultural implement, the combination of a tractor having means for supplying fluid under pressure, tool means operatively connected in draft transmitting relation with said tractor, a pair of separately operable hydraulic units deriving energy from said pressure supply means, at least one of said units being a double acting unit, means connecting said one unit with said tool means for adjusting the depth of operation thereof, and means connecting the other hydraulic unit with said tool means for raising the latter into transport position.

5. An agricultural machine comprising a tractor having means for supplying fluid under pressure, tool means connected with the tractor, means for gauging the depth of operation of said tool means, means for lifting said tool means, a first hydraulic unit deriving power from said fluid under pressure for actuating said gauging means, and a separate hydraulic unit deriving power from said fluid under pressure for actuating said lifting means.

6. An agricultural machine comprising a tractor having means for supplying fluid under pressure, tool means movably connected with the tractor, gauge means normally movable with said tool means for gauging the operation thereof, a first hydraulic unit mounted on the tractor and deriving power from said fluid under pressure for shifting the position of said gauge means relative to said tool means, and a second hydraulic unit on the tractor also deriving power from said fluid under pressure and connected with said tool means for raising the latter into inoperative position.

7. In an agricultural machine, a tractor including a platform and a seat connected therewith, and a pair of hydraulic units including cylinder members disposed on opposite sides of said seat and extending at their rear ends adjacent said seat below said platform so as to provide substantially clear foot space on the platform above the rear ends of said cylinder members.

8. In an agricultural machine, a tractor having a governor housing and a platform, a pair of hydraulic units including cylinder members extending at their rear ends below said platform, and means connecting the forward ends of said cylinder members with said governor housing.

9. The combination with a tractor having means for supplying fluid under pressure and a rear axle construction including a rear axle housing and a driving member therein, of a pair of rock shafts supported on said rear axle housing, a pair of cylinder units disposed in said rear axle housing on opposite sides of said driving member, controllable conections between said cylinder units and said fluid pressure supply means, and connections between said cylinder units and said rock shafts.

10. The combination with a tractor having a motor, of means for supplying fluid under pressure operatively connected with said motor, an agricultural implement connected with the tractor and having two adjustments, one constituting a depth adjustment and the other an operating and lowering adjustment, a pair of hydraulic units deriving power from said supply means, means connecting one hydraulic unit with said implement for effecting an operating adjustment, and means connecting the hydraulic unit with said implement for effecting a raising and lowering adjustment.

11. In an agricultural implement comprising a mobile frame and a ground working tool supported thereon by means providing for shifting movement relative thereto, the combination of gauge means mounted on said tool by means providing for shifting movement relative thereto, a first piston and cylinder unit connected to shift said gauge means relative to said tool, a second piston and cylinder unit connected to shift both said tool and said gauge means relative to said frame, and means for supplying fluid under pressure to each of said units, selectively.

12. In an agricultural implement comprising a mobile frame and a ground working tool supported thereon by means providing for shifting movement relative thereto, the combination of gauge means mounted on said frame by means providing for shifting movement relative to said frame and to said tool, a first piston and cylinder unit connected to shift said gauge means relative to said frame and to said tool, a second piston and cylinder unit connected to shift both said gauge means and said tool relative to said frame, and means for supplying fluid under pressure to each of said units, selectively.

13. In an agricultural implement comprising a mobile frame and a ground working tool supported thereon by means providing for vertical movement relative thereto, the combination of gauge means mounted on said tool by means providing for vertical movement relative thereto, a first piston and cylinder unit mounted on said frame, means connecting said unit with said gauge means to raise and lower the latter relative to said tool, a second piston and cylinder unit mounted on said frame, means connecting said second unit with said tool to raise and lower both said tool and said gauge means relative to said frame, and means on said frame for supplying fluid under pressure to each of said units, selectively.

14. In an agricultural implement comprising a mobile frame and a ground working tool supported thereon by means providing for vertical movement relative thereto, the combination of gauge means mounted on said frame by means providing for vertical movement relative to said frame and to said tool, a first piston and cylinder unit mounted on said frame, means connecting said unit with said gauge means to raise and lower the latter relative to said tool and to said frame, a second piston and cylinder means mounted on said frame, means connecting said second unit with said tool to raise and lower both said tool and said gauge means relative to said frame, and means on said frame for supplying fluid under pressure to each of said units, selectively, said connecting means being adapted to transmit movement to said tool and gauge means from said second unit without appreciable relative movement between said gauge means and said tool.

15. In an agricultural implement comprising a mobile frame and a ground working tool having a supporting beam swingably mounted thereon for vertical movement relative thereto, the combination of a gauge arm swingably mounted on said frame for vertical movement relative thereto, ground contacting gauge means on said arm, a pair of hydraulic power units mounted on said frame, means for supplying fluid under pressure to each of said units, selectively, means for connecting one of said units with said beam for raising and lowering the latter, adjustable means connecting said gauge arm with said tool, and connections between said adjustable connecting means and the other of said hydraulic power units for adjusting said connecting means to swing said gauge arm relative to said tool beam.

16. In an agricultural implement comprising a mobile frame and a ground working tool having a supporting beam swingably mounted thereon for vertical movement relative thereto, the combination of a gauge arm swingably mounted on said frame for vertical movement relative thereto, ground contacting gauge means on said arm, a pair of hydraulic power units mounted on said frame, means for supplying fluid under pressure to each of said units, selectively, means for connecting one of said units with said beam for raising and lowering said beam and said arm, adjustable means connecting said gauge arm with said tool, and means connecting said adjustable means and the other of said hydraulic power units and passing substantially through the axis of movement of said gauge arm, for adjusting said connecting means to adjust the position of said gauge arm relative to said beam, said relative position being substantially unaffected by movement of said beam and arm under control of said one hydraulic unit.

17. In an agricultural implement comprising a mobile frame and a ground working tool having a supporting beam swingably mounted thereon for vertical movement relative thereto, the combination of a gauge arm swingably mounted on said frame for vertical movement relative thereto, ground contacting gauge means on said arm, a pair of hydraulic power units mounted on said frame, means for supplying fluid under pressure to each of said units, selectively, means for connecting one of said units with said beam for raising and lowering said beam and said arm, a pair of pivotally connected toggle links connecting said gauge arm with said tool beam, and means connecting the point of pivotal connection between said links with the other of said hydraulic units for adjusting the toggle links to swing said gauge arm relative to said tool beam.

18. In an agricultural implement comprising a mobile frame and a ground working tool having a supporting beam swingably mounted thereon for vertical movement relative thereto, the combination of a gauge arm swingably mounted on said frame for vertical movement relative thereto, ground contacting gauge means on said arm, a pair of hydraulic power units mounted on said frame, means for supplying fluid under pressure to each of said units, selectively, means for connecting one of said units with said beam for raising and lowering said beam and said arm, said connecting means including a lost motion connection providing for vertical movement of said tool beam independent of said hydraulic unit, a pair of pivotally connected toggle links connecting said gauge arm with said tool beam, and linkage means connecting the point of pivotal connection between the toggle links with the other of said hydraulic units for adjusting the toggle links to swing said gauge arm relative to said tool beam, said linkage means including a pivot connection substantially on the axis of movement of said gauge arm, thereby permitting vertical movement of said arm and beam substantially without affecting the position of said arm relative to said beam.

THEOPHILUS BROWN.